(12) United States Patent
Ikuta et al.

(10) Patent No.: US 7,592,063 B2
(45) Date of Patent: Sep. 22, 2009

(54) QUARTZ GLASS SUBSTRATE AND PROCESS FOR ITS PRODUCTION

(75) Inventors: Yoshiaki Ikuta, Schenectady, NY (US); Shinya Kikugawa, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 233 days.

(21) Appl. No.: 11/514,997

(22) Filed: Sep. 5, 2006

(65) Prior Publication Data

US 2008/0057291 A1   Mar. 6, 2008

(51) Int. Cl.
  B32B 3/00   (2006.01)
  B32B 17/06  (2006.01)
  B32B 18/00  (2006.01)
  B32B 3/16   (2006.01)
  C03C 3/112  (2006.01)
  C03C 3/06   (2006.01)
  C03C 10/16  (2006.01)
  G01N 23/00  (2006.01)

(52) U.S. Cl. .............. 428/312.6; 428/426; 428/325; 428/49; 501/57; 501/54; 65/33.3; 65/378

(58) Field of Classification Search ............... None
  See application file for complete search history.

(56) References Cited

U.S. PATENT DOCUMENTS 5,958,809 A * 9/1999 Fujiwara et al. ............... 501/54
6,499,317 B1 * 12/2002 Ikuta et al. ..................... 65/378
2002/0151425 A1 * 10/2002 Fujinoki et al. ............... 501/54
2003/0138587 A1 * 7/2003 Otsuka et al. ............... 428/64.1
2006/0070703 A1 * 4/2006 Johnson et al. ........ 156/345.48

FOREIGN PATENT DOCUMENTS

| EP | 0 401 845 A2 | 12/1990 |
| EP | 1 103 528 A2 | 5/2001 |
| EP | 1 188 723 A1 | 3/2002 |
| JP | 3319568 | 6/2002 |
| JP | 3684206 | 6/2005 |
| WO | WO 01/92175 A1 | 12/2001 |
| WO | WO 2004089836 A1 * | 10/2004 |

OTHER PUBLICATIONS

Anand Agarwal, et al., "A Simple IR Spectroscopic Method for Determining Fictive Temperature of Silica Glasses", Journal of Non-Crystalline Solids, 185, 1995, pp. 191-198.

* cited by examiner

Primary Examiner—Jennifer McNeil
Assistant Examiner—Vera Katz
(74) Attorney, Agent, or Firm—Oblon, Spivak, McClelland, Maier & Neustadt, L.L.P.

(57) ABSTRACT

For a substrate having fine convexoconcave patterns on its surface, the dimensions of the convexoconcave patterns in a vertical direction of a quartz glass substrate are controlled to be uniform with extreme accuracy and over the entire substrate surface. The quartz glass substrate is made to have a fictive temperature distribution of at most 40° C. and a halogen concentration of less than 400 ppm, and the etching rate of the surface of the quartz glass substrate is made uniform, whereby the dimensions of the convexoconcave patterns in a vertical direction of the quartz glass substrate are controlled to be uniform with good accuracy and over the entire substrate surface.

16 Claims, 3 Drawing Sheets

Fig. 1(a) Lines (convex)
PRIOR ART
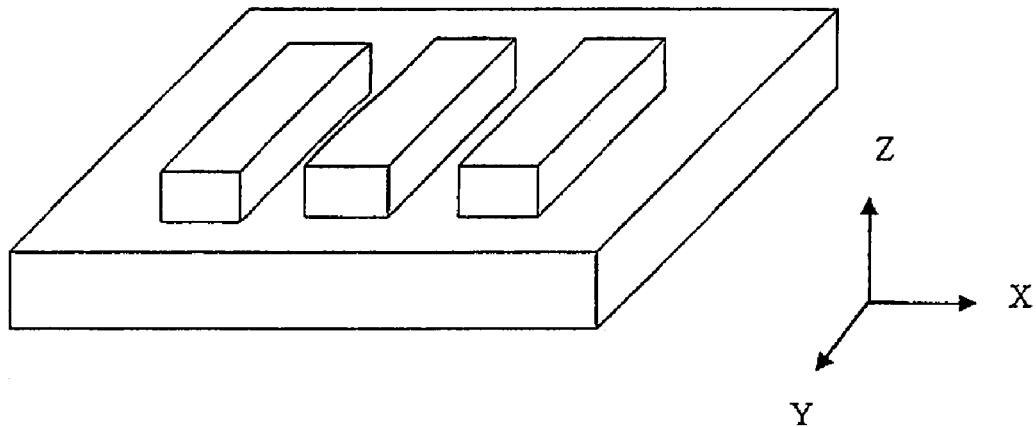
Fig. 1(b) Lines (concave)
PRIOR ART
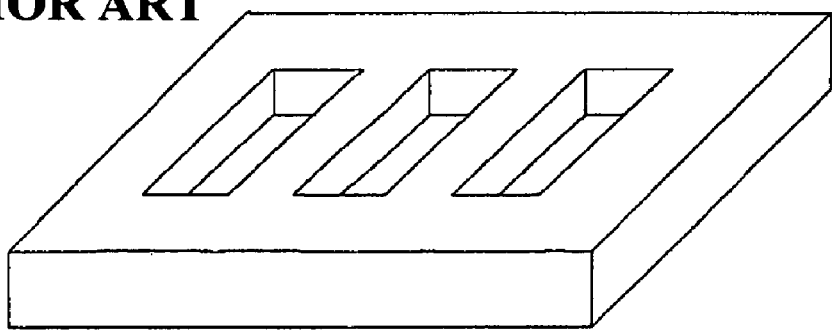
Fig. 1(c) Holes (concave)
PRIOR ART
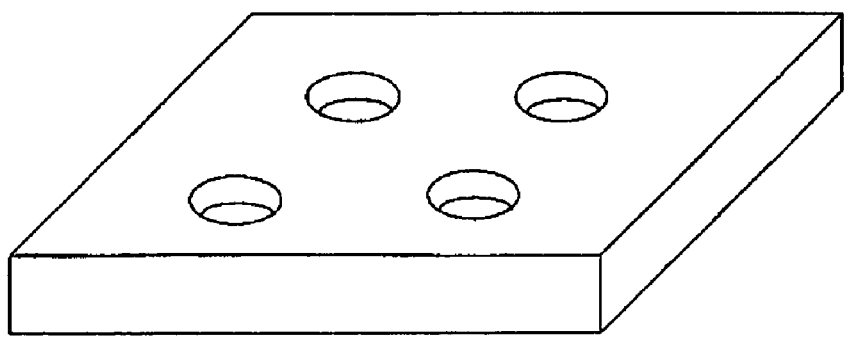

Example 1: Held at 1,250°C for 15 hours → annealed to 1,050°C at a rate of 20°C/hr → heater off Example 2: Held at 1,250°C for 15 hours → annealed to 1,050°C at a rate of 1.7°C/hr → annealed to 900°C at a rate of 75°C/hr → heater off Example 3: Held at 1,250°C for 24 hours → annealed to 1,150°C at a rate of 2°C/hr → annealed to 1,000°C at a rate of 0.4°C/hr → annealed to 700°C at a rate of 3°C/hr → heater off

QUARTZ GLASS SUBSTRATE AND PROCESS FOR ITS PRODUCTION

BACKGROUND OF THE INVENTION

1. Field of the Invention

The present invention relates to a quartz glass substrate for a substrate having fine convexoconcave patterns on its surface. More particularly, it relates to a quartz glass substrate to be used, for example, as a template substrate for nanoimprint, a photomask substrate for semiconductor lithography such as a Levenson phase shift photomask or a chromeless phase shift photomask, or a MEMS substrate such as a microreactor or a biochip.

2. Discussion of Background

With respect to the configuration of the convexoconcave patterns to be formed on a glass substrate surface, various types such as linear convexoconcaves and circular convexoconcaves are conceivable depending upon the particularly purpose. Typical patterns are shown in FIGS. 1(a), 1(b) and 1(c). As a method for forming such convexoconcave patterns, a method employing a photosensitive organic film and etching i.e. a so-called photolithographic process is common. For example, a method by a photolithographic process employing a positive photosensitive organic film will be briefly described below.

1) A glass substrate having a flat and smooth surface is prepared.

2) A photosensitive organic film (so-called photoresist) is formed on the surface of the glass substrate.

3) The photosensitive organic film is irradiated with high energy rays such as electron rays, X-rays or ultraviolet rays (wavelength: 180 to 400 nm) only at the portions corresponding to the final concave patterns of the substrate to have the desired portions of the organic film exposed. Then, the exposed organic film is removed by means of e.g. an alkaline solution or oxygen gas to form convexoconcave patterns in the organic film on the glass (the glass is exposed at the portions corresponding to the final concave patterns of the substrate, and the portions corresponding to the convex patterns are covered with the organic film).

4) The glass substrate is left in an atmosphere of a reagent (such as hydrofluoric acid, ammonium fluoride or potassium hydroxide) or gas (such as a fluorine compound gas such as $F_2$, $SF_6$, $CHF_3$, $CF_4$ or $NF_3$, or a chlorine type gas such as $CHCl_3$) which is capable of etching the glass substrate, whereby the glass will be eroded (etched) only at the portions where the glass is exposed without being covered with the organic film, and the convexoconcave patterns of the organic film will be transferred to the glass substrate surface.

5) The organic film on the convex portions of the glass substrate surface is removed by means of e.g. an alkaline solution, an ozone gas or a mixed liquid of sulfuric acid with an aqueous hydrogen peroxide solution.

The dimensions of the convexoconcave patterns on the glass substrate formed by such a method are desired to be as close as possible to the expected designed dimensions, and in a case where a plurality of patterns of the same configuration are to be formed on a glass substrate, such pattern dimensions are desired to be uniform as much as possible within the glass substrate. In order to prepare a glass substrate having convexoconcave patterns having such a desired dimensional accuracy, two points are important i.e. to form patterns with high accuracy in the organic film in the above step 3) and to control the etching rate of the glass substrate and its uniformity in the above step 4). Here, the dimensional accuracy of the convexoconcave patterns is required to be considered with respect to three directions. In the case of dry etching of a glass substrate by means of a corrosive gas, for the dimensional accuracy in a horizontal direction (the dimensional accuracy in the X- and Y-directions shown in FIG. 1(a)), the process control of the former (the above step 3)) is particularly important, and for the dimensional accuracy in a vertical direction (the dimensional accuracy in the Z-direction shown in FIG. 1(a)), the process control of the latter (the above step 4)) is particularly important. Further, in the case of wet etching by means of a corrosive reagent, the process control of the above step 4) is influential over the pattern dimensional accuracy in the three directions.

Heretofore, various attempts have been made to make the etching rate uniform. For example, Patent Document 1 discloses that in plasma etching, the non-uniformity in the etching rate caused by the shift of the surface potential of the substrate resulting in the vicinity of the interface between the etching portion and the non-etching portion (the etching mask portion) can be resolved by using a substrate having a thin thickness. Further, Patent Document 2 proposes that an etching mask of the same material as the substrate is used in order to improve the uniformity of the etching rate which is likely to be deteriorated by non-uniformity of the surface potential of the substrate caused by the difference in the material of the surface between the etching portion and the non-etching portion. However, in either method, due to the non-uniformity of the etching rates specific to the materials, it has been difficult to make the etching rate uniform.

Patent Document 1: Japanese Patent No. 03684206
Patent Document 2: Japanese Patent No. 3319568

The etching rate of a quartz glass substrate is not necessarily uniform, and there has been a problem such that due to variation in the etching rate within a substrate or between substrates, the dimensions of convexoconcave patterns formed on the glass substrate vary, and particularly in the case of dry etching which is currently most common as an etching method, the dimensional accuracy in a vertical direction varies. With respect to such dimensional variation in a vertical direction of convexoconcave patterns, for example, in the case of a substrate to be used for e.g. a Levenson phase shift photomask or chromeless phase shift photomask for semiconductor photolithography, the degree of the phase shift influential over the resolution performance in a lithography process, depends on the concave pattern dimension in a vertical direction (the depth of concave).

Accordingly, it is desired to control the dimensions of convexoconcave patterns in a vertical direction to be uniform with accuracy as high as possible and over the entire substrate surface. Thus, variation in the dimensions in a vertical direction of convexoconcave patterns attributable to the non-uniformity of the etching rate of a glass substrate, is a serious problem.

SUMMARY OF THE INVENTION

In a first aspect, the present invention provides a quartz glass substrate having a fictive temperature distribution of at most 40° C. and a halogen concentration of less than 400 ppm.

In a second aspect, the present invention provides a quartz glass substrate having a fictive temperature distribution of at most 40° C., a halogen concentration of at least 400 ppm, and a halogen concentration distribution of at most 400 ppm.

In a third aspect, the present invention provides the silica glass substrate according to the first or second aspect of the present invention, wherein the halogen is chlorine or fluorine.

In a fourth aspect, the present invention provides a process for producing a quartz glass substrate, which comprises (a) a step of forming a synthetic quartz glass block by subjecting a glass-forming material to flame hydrolysis, (b) a step of holding the quartz glass block at a temperature of from 800 to 1400° C. for at least one hour, followed by annealing at a rate of at most 15° C./hr to a temperature lower by at least 200° C. than the temperature for holding, to make the fictive temperature of the quartz glass block uniform, and (c) cutting the quartz glass block in a prescribed thickness.

In a fifth aspect, the present invention provides the process for producing a quartz glass substrate according to the fourth aspect, wherein the step of forming a synthetic quartz glass block, comprises (a1) a step of depositing and growing, on a substrate, fine particles of quartz glass obtained by the flame hydrolysis, to obtain a porous synthetic quartz glass, (a2) a step of holding the porous synthetic quartz glass at a temperature of from 1300 to 1600° C. for at least 5 hours to obtain a transparent synthetic quartz glass, and (a3) molding the transparent synthetic quartz glass into a quartz glass block.

In a sixth aspect, the present invention provides the process for producing a quartz glass substrate according to the fourth or fifth aspect, wherein the fictive temperature distribution in the quartz glass block after the step (c) is adjusted to be at most 40° C.

In a seventh aspect, the present invention provides the process for producing a quartz glass substrate according to any one of the fourth to sixth aspects, wherein a compound having no halogen atoms is used as the glass-forming material.

In a eighth aspect, the present invention provides a quartz glass substrate with a ratio of the etching rate distribution to the average etching rate being at most ±1%.

By the use of the glass substrate according to the present invention, it is possible to minimize variation in the etching rate of the substrate.

BRIEF DESCRIPTION OF THE DRAWINGS

FIGS. 1(a), 1(b) and 1(c) show typical convexoconcave patterns to be formed on a glass substrate surface.

DETAILED DESCRIPTION OF THE PREFERRED EMBODIMENTS

The present inventors have conducted a detailed study on the composition and factors of quartz glass which are influential over the etching rate of quartz glass and as a result, have found that the halogen concentration in quartz glass and the fictive temperature of quartz glass are important parameters influential over the etching rate of quartz glass. Namely, they have found that the fictive temperature in quartz glass is influential over the etching rate of the quartz glass, and the higher the fictive temperature is, the higher the etching rate becomes.

Even if etching is carried out under completely the same conditions (with respect to the etching parameters such as the type of gas or liquid, concentration, pressure, temperature, time, etc.), if the fictive temperatures or the halogen concentrations of such quartz glasses are different, the etching rates will not be the same, and it is essential not only to control the etching parameters but also to take such two factors of quartz glass into consideration. From such a viewpoint, with the quartz glass of the present invention, the fictive temperature distribution is adjusted to be at most 40° C., and the halogen concentration distribution is adjusted to be at most 400 ppm.

To investigate the relation between the fictive temperature and the etching rate of a quartz glass substrate, quartz glass blocks synthesized by flame hydrolysis (halogen concentration: less than 10 ppm, OH group concentration: 30 ppm) were held in a nitrogen gas atmosphere at several different temperatures for a prescribed time to prepare synthetic quartz glass blocks having different fictive temperatures. Samples were cut out from the respective center portions of the quartz glass blocks, and using a 39 wt % hydrogen fluoride aqueous solution, a test was carried out to etch the quartz glass samples at room temperature. The fictive temperature dependency of the etching rate in such a case is shown in FIG. 2.

Figure 2:
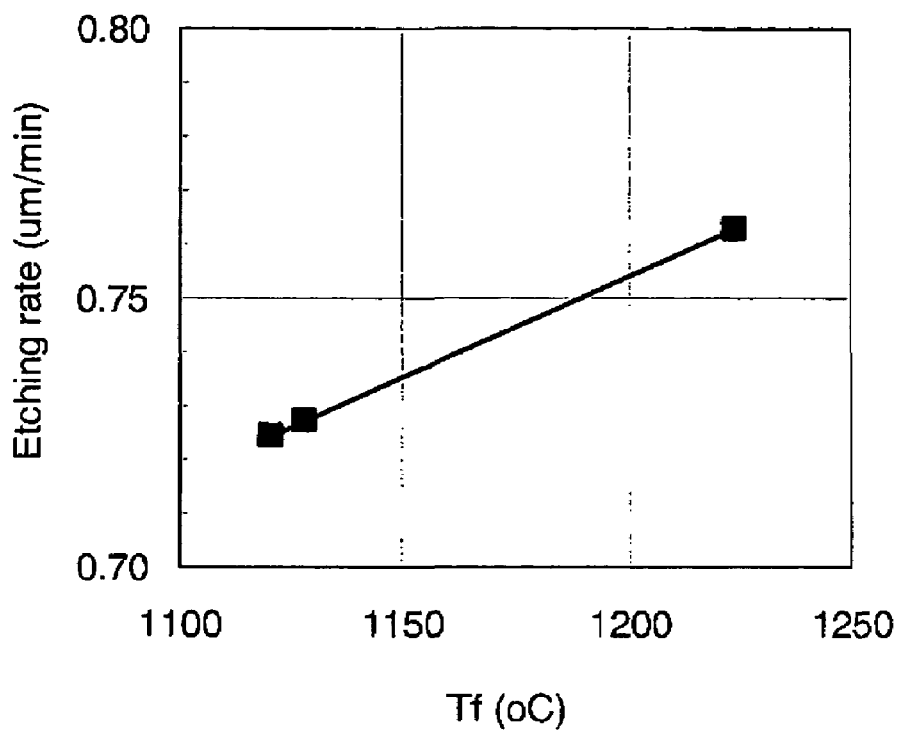
FIG. 2 shows the fictive temperature dependency of the etching rate (HF: 39 wt %, room temperature).

From the data in FIG. 2, it is clear that the etching rate of quartz glass depends on the fictive temperature, and in order to obtain a uniform etching rate, the fictive temperature distribution of quartz glass is preferably as small as possible. In the case of FIG. 2 employing a 39 wt % hydrogen fluoride aqueous solution at room temperature, the fictive temperature dependency of the etching rate is $3.7 \times 10^{-4}$ μm/min/° C. The etching rate of quartz glass under the same conditions is about 0.7 to 0.8 μm/min, and it has been found that in order to suppress the etching rate distribution of quartz glass to be at most ±1%, the fictive temperature distribution of quartz glass is preferably within 40° C., more preferably within 20° C., further preferably within 10° C. As a method for controlling the fictive temperature distribution, the quartz glass is held at a prescribed temperature within a range of from 800 to 1,400° C. for at least 1 hour to bring the fictive temperature of the quartz glass to be substantially equal to the holding temperature, followed by slow cooling to a temperature lower by from about 200 to 400° C. than the holding temperature at a slow rate of at most 15° C./hr to avoid formation of a temperature distribution in the quartz glass and then by quenching at a relatively fast rate of at least 15° C./hr.

Here, the fictive temperature of quartz glass was obtained by the position of an absorption peak in the vicinity of a wavelength of 2,260 $cm^{-1}$ by means of an infrared spectrophotometer in accordance with a literature (A. Agarwal, K. M. Dabis and M. Tomozawa, "A simple IR spectroscopic method for determining fictive temperature of silica glass", J. Non-Cryst. Solids., 185, 191-198 (1995)).

Further, in the present invention, the halogen concentration in quartz glass is influential over the etching rate of the quartz glass, and the higher the halogen concentration, the higher the etching rate. Here, the halogen is meant for fluorine, chlorine or bromine. In order to examine the dependency of the etching rate on the halogen concentration in the quartz glass, a fluorine-containing synthetic quartz glass block was obtained by the following method.

Silicon tetrachloride was subjected to flame hydrolysis to prepare a porous quartz glass body. Then, the obtained porous quartz glass body was held in an atmosphere of silicon tetrafluoride/oxygen=10/90 vol % at a temperature of from room temperature to 1,200° C. for 2 hours. Then, the temperature was raised to 1,500° C. in a reduced pressure atmosphere of 1.3 kPa for transparent vitrification to obtain a synthetic quartz glass block containing fluorine in an amount of 0 wtppm to 15,000 wtppm.

From the center of the quartz glass block, a sample specimen was cut out, and the halogen concentration dependency of the etching rate was examined in a case where the quartz glass was subjected to etching by means of a 39 wt % hydrogen fluoride aqueous solution.

Figure 3:
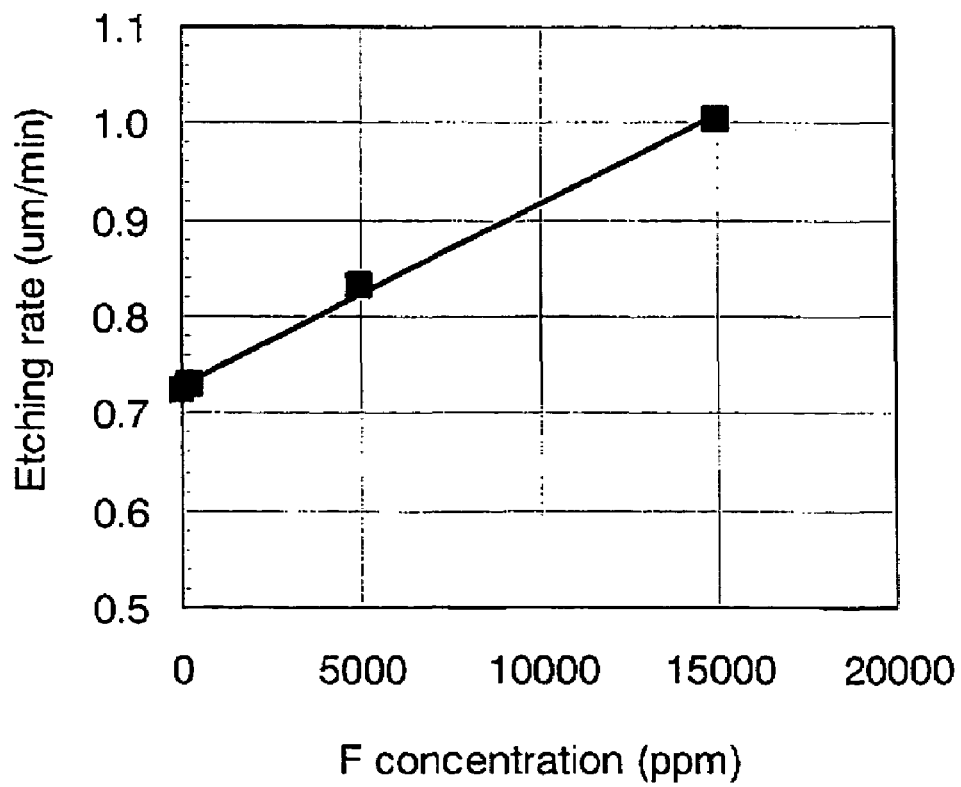
FIG. 3 shows the halogen concentration dependency of the etching rate (HF: 39 wt, room temperature).

The etching rate depends on the halogen concentration in the quartz glass. As an example, FIG. 3 shows the fluorine concentration dependency of the etching rate. Here, in FIG. 3, the fictive temperature of the sample actually measured was corrected to 1,120° C. by means of the fictive temperature dependency of the etching rate shown in FIG. 2. The higher the halogen concentration, the higher the etching rate. In the case of FIG. 2, employing a 39 wt % hydrogen fluoride aqueous solution at room temperature, the fluorine concentration dependency of the etching rate is $1.9 \times 10^{-5}$ μm/min/wtppm-F. Therefore, in order to obtain a uniform etching rate, it is necessary to make the halogen concentration in the quartz glass to be uniform as far as possible, and for example, in order to suppress the etching rate distribution of the quartz glass to be at most ±1% under the same conditions, it is necessary to make the halogen concentration distribution in the quartz glass to be at most ±400 ppm. Accordingly, it has been found that in order to obtain the uniformity of the excellent etching rate of quartz glass, the halogen concentration distribution in the quartz glass should be made at most 400 ppm, preferably at most 200 ppm, more preferably at most 100 ppm.

Here, the fluorine content in the synthetic quartz glass was analyzed by a fluorine ion electrode method. The analytical method for the fluorine content is as follows. In accordance with the method disclosed in the Journal of Chemical Society of Japan, 1972 (2), 350, synthetic quartz glass was heated and melted by means of anhydrous sodium carbonate, and to the obtained melt, distilled water and hydrochloric acid (volume ratio of 1:1) were added to obtain a sample liquid. The electromotive force of the sample liquid was measured by a radiometer by using a fluorine ion selective electrode and, as a comparative electrode, each of No. 945-220 and No. 945-468 manufactured by Radiometer Trading, whereupon the fluorine content was obtained, based on a calibration curve preliminarily prepared by using a fluorine ion standard solution.

The quartz glass of the present invention can be prepared by a direct method, a soot method (VAD method or OVD method) or a plasma method. Particularly preferred is a soot method, whereby the OH group concentration in the synthetic quartz glass can relatively easily be controlled, and the temperature during the synthesis is low which is advantageous to avoid inclusion of impurities such as chlorine or metals.

The source material to form glass is not particularly limited so long as it is a gasifiable material. It may, for example, be a silicon halide compound, such as a chloride such as $SiCl_4$, $SiHCl_3$, $SiH_2Cl_2$ or $SiCH_3Cl_3$, a fluoride such as $SiF_4$, $SiHF_3$ or $SiH_2F_2$, a bromide such as $SiBr_4$ or $SiHBr_3$, or an iodide such as $SiI4$, or an alkoxysilane represented by $R_nSi(OR)_{4-n}$ (wherein R is a $C_{1-4}$ alkyl group, and n is an integer of from 0 to 3). Particularly preferred is an alkoxysilane which does not contain a halogen influential over the etching rate.

With respect to the quartz glass of the present invention, in order to make the fictive temperature distribution uniform, the produced quartz glass block is held in an electric furnace at a temperature within a range of from 800 to 1,400° C. for at least 1 hour. In such a case, the temperature distribution in the electric furnace is preferably at most 40° C., more preferably at most 10° C., further preferably at most 5° C.

The holding time is preferably at least 800° C. and at most 1,400° C. However, as the temperature becomes high, impurities (such as alkali metals (Na, K, etc.), alkaline earth metals (Mg, Ca, etc.), transition metals (Fe, Ti, Ni, Al, Zn, Ce, Cu, etc.)) are likely to diffuse and be included in the quartz glass from the atmosphere during the heating. Therefore, the temperature is preferably at a level of from 900 to 1,200° C.

The holding time depends on the holding temperature, and as the temperature is high, the structural relaxation of the quartz glass is quick, and the fictive temperature becomes equal to the holding temperature in a relatively short period of time. Specifically, the minimum holding time at 1,400° C. is about 1 hour, the minimum holding time at 1,300° C. is about 5 hours, the minimum holding time at 1,200° C. is about 20 hours, and the minimum holding time at 1,000° C. is about 100 hours.

The annealing time is preferably the minimum time required for the fictive temperature to reach the prescribed temperature and for its distribution to become uniform.

The higher the halogen concentration in the quartz glass, the lower the viscosity of the quartz glass at a high temperature. Therefore, as the halogen concentration in the quartz glass is high, the annealing time may be made short. In this sense, addition of a halogen element to the quartz glass is preferred, since it is thereby possible to prevent deterioration of the purity of the quartz glass during the heat treatment.

By the heat treatment of the quartz glass block at a constant temperature for a prescribed time as mentioned above, it is possible to relax the structure of the quartz glass block and to adjust the fictive temperature of the entire block to a level substantially close to the holding temperature, and it is possible to obtain a quartz glass block having a fictive temperature distribution at the same level as the temperature distribution in the electric furnace. Further, it is preferred that the quartz glass block is held at a constant temperature for a prescribed time, followed by annealing at a slow rate such that the temperature distribution in the quartz glass block is always at most 50° C., specifically at a rate of at most 15° C./hr, to a temperature lower by 200° C. than the holding temperature. If it is rapidly cooled, there will be a temperature distribution in the quartz glass block during the cooling, whereby the fictive temperature distribution in the quartz glass block may sometimes deteriorate, such being undesirable.

For the quartz glass of the present invention, a process for treatment to make the halide concentration in the quartz glass uniform, may be added between the synthesis step for preparing the quartz glass and the step for heat treating the quartz glass to adjust the fictive temperature. The process to make the halide concentration uniform may, for example, be a method of heating and kneading at a temperature of from 1,500 to 1,700° C. by a horizontal floating zone method (FZ method), or a method for heating at a temperature of at least 1,500 to 1,700° C. to let the glass deform by gravity in a predetermined direction to form into a desired shape.

EXAMPLES

Now, the present invention will be described in further detail with reference to Examples. However, it should be understood that the present invention is by no means restricted by such specific Examples. Example 1 is a Comparative Example and Examples 2 to 5 are Examples of the present invention.

Examples 1 to 3

Figure 4:
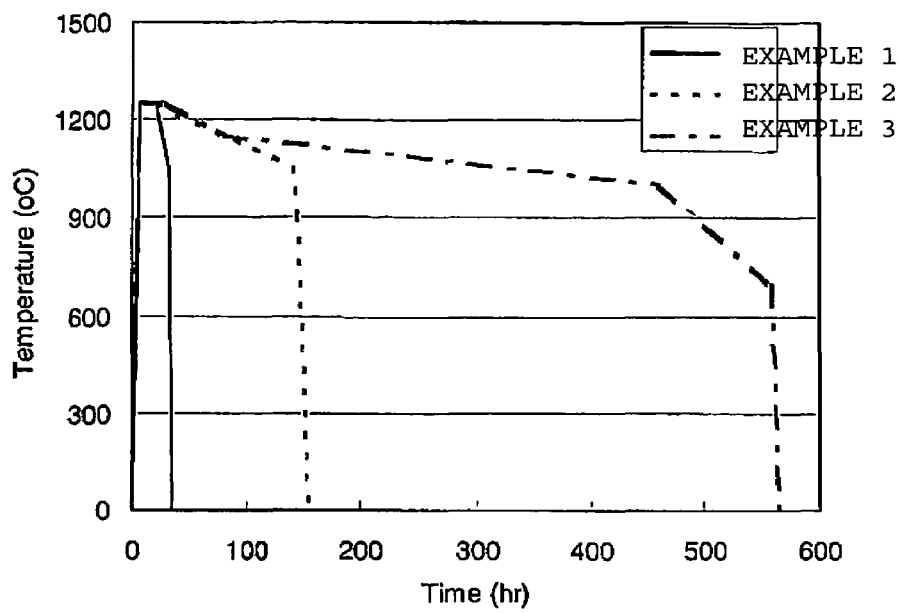
FIG. 4 shows heat treatment conditions for glass blocks in Examples 1 to 3.

Using silicon tetrachloride as a raw material, fine particles of quartz glass were deposited and grown by flame hydrolysis (VAD method) to prepare a porous synthetic quartz glass first. Then, the obtained porous synthetic quartz glass was heated in a reduced pressure atmosphere to 1,450° C. to obtain a transparent synthetic quartz glass (OH concentration: 30 ppm). The obtained synthetic quartz glass was set in a 7.5 inch mold and heated to 1,800° C. in a nitrogen atmosphere to form a quartz glass block of 7.5 inch square×45 cm. The obtained quartz glass block was subjected to heat treatment in the same nitrogen atmosphere under different conditions (Examples 1, 2 and 3) shown, respectively, in FIG. 4. Then, four side surfaces of each quartz glass block were ground to obtain a 6 inch square×45 cm block, whereupon one substrate with a thickness of 0.25 inch was sliced from each of the center portion, the upper end portion and the lower end portion.

Each of the obtained substrates was polished by means of cerium oxide until a mirror surface was obtained (until the surface roughness (RMS) became at most 0.5 nm). Then, the fictive temperatures at a total of 25 points with a distance of 35 mm within a central 140 mm square area of the substrate, were measured by the above-mentioned method by means of an infrared spectrophotometer, and the difference (PV value) between the maximum fictive temperature and the minimum fictive temperature, and the average value, at the total of 25 points in the same area, were calculated. This PV value was taken as the value for the fictive temperature distribution.

Then, the etching rate distribution by a 39 wt % hydrogen fluoride aqueous solution within the same area was obtained. The obtained results are shown in Table 1.

In this Example, the halogen element which may possibly be contained in the quartz glass is chlorine only. However, when the chlorine concentration in the quartz glass was measured by a fluorescent X-ray analysis, it was below the detective limit (10 ppm).

Example 4

A quartz glass block is prepared in the same manner as in Example 3 except that hexamethyldisiloxane is used as the raw material in the preparation of the porous synthetic quartz glass. One substrate with a thickness of 0.25 inch is sliced from the center portion of the obtained block, and in the same manner as in Example 3, it is polished, and the fictive temperature and its distribution are measured, and the etching rate distribution by a 39 wt % hydrogen fluoride aqueous solution with the same area is obtained. The obtainable results are shown in Table 1.

In this Example, a halogen element which may possibly be contained in the quartz glass is chlorine only. However, when chlorine concentration in the quartz glass is measured by a fluorescent X-ray analysis, it is below the detection limit (10 ppm).

Example 5

Using silicon tetrachloride as a raw material, a porous synthetic quartz glass was firstly prepared by flame hydrolysis (VAD method). The obtained porous synthetic quartz glass was held at room temperature in an atmosphere of silicon tetrafluoride/helium=5/95 vol % for 1 hour and then heated to 1,450° C. in a reduced pressure atmosphere to obtain a transparent synthetic quartz glass containing fluorine (OH concentration: 30 ppm).

The obtained synthetic quartz glass was set in a 7.5 inch mold and heated to 1,800° C. in a nitrogen atmosphere and formed into a quartz glass block of 7.5 inch square×45 cm. The obtained quartz glass block was subjected to heat treatment in the same nitrogen atmosphere under the same conditions as in Example 2. Then, four side surfaces of the quartz glass block were ground to obtain a 6 inch square×45 cm block, and from the center portion, one substrate with a thickness of 0.25 inch was sliced.

The obtained substrate was polished by means of cerium oxide until a mirror surface was obtained (until the surface roughness (RMS) became at most 0.5 nm). Then, the fictive temperature distribution within a central 140 mm square area of the substrate was measured by the above-mentioned method by means of an infrared spectrophotometer.

Then, by means of a Fizeau interferometer (ZygoMarkIV), the 633 nm refractive index distribution within a 140 mm square area at the center of the substrate was measured. From the obtained refractive index distribution, the fluorine concentration distribution was obtained (here, the fluorine concentration distribution (ppm)=the refractive index distribution (ppm)×2.5).

Further, in the same manner as in Examples 1 and 2, the etching rate distribution was obtained. Finally, a test specimen was cut out from the center portion of the sample, and the fluorine concentration was obtained by the fluorine ion electrode method as described above.

The obtained results are shown in Table 1. In Example 1, the variation in the etching rate within each substrate as well as among the three substrates cut out from the same block is large at a level of at least 1%. Whereas, in Example 2, the variation in the etching rate within each substrate as well as among the three substrates cut out from the same block is as small as less than 1%, such being desirable. Further, also in Examples 3 and 4, the variation in the etching rate within the substrate is as small as less than 1%, such being desirable, like in Example 2.

TABLE 1

| Example No. | Position of the block from which the substrate was cut out | Fictive temperature (° C.) | | Halogen concentration (ppm) | | Etching rate distribution | |
| --- | --- | --- | --- | --- | --- | --- | --- |
| | | Average value | PV value | Average value | PV value | Average value (μm/min) | PV value/average value × 100 (%) |
| 1-1 | Upper end | 1158 | 51 | <10 | <10 | 0.738 | 2.56 |
| 1-2 | Center | 1170 | 50 | <10 | <10 | 0.743 | 2.50 |
| 1-3 | Lower end | 1139 | 46 | <10 | <10 | 0.731 | 2.33 |
| 2-1 | Upper end | 1149 | 28 | <10 | <10 | 0.735 | 1.42 |
| 2-2 | Center | 1145 | 23 | <10 | <10 | 0.733 | 1.16 |
| 2-3 | Lower end | 1150 | 23 | <10 | <10 | 0.735 | 1.16 |
| 3-1 | Center | 1090 | 9 | <10 | <10 | 0.714 | 0.47 |
| 4-1 | Center | 1095 | 10 | <10 | <10 | 0.715 | 0.42 |
| 5-1 | Center | 1128 | 15 | 876 | 75 | 0.741 | 0.95 |

What is claimed is:

1. A quartz glass substrate having a convexoconcave pattern and having a fictive temperature distribution of at most 40° C., a halogen concentration of at least 400 ppm, and a halogen concentration distribution of at most 400 ppm;
   wherein the halogen is fluorine or chlorine; and
   wherein said fictive temperature distribution, said halogen concentration and said halogen concentration distribution are properties of said convexoconcave pattern.

2. The quartz glass substrate as claimed in claim 1, wherein said halogen concentration distribution at most 200 ppm.

3. The quartz glass substrate as claimed in claim 1, wherein said halogen concentration distribution at most 100 ppm.

4. The quartz glass substrate as claimed in claim 1, which contains chlorine.

5. The quartz glass substrate as claimed in claim 1, which contains fluorine.

6. The quartz glass substrate as claimed in claim 1, wherein said convexoconcave patterns are on the surface of the substrate.

7. The quartz glass substrate as claimed in claim 1, wherein said convexoconcave pattern is linear convexoconcave.

8. The quartz glass substrate as claimed in claim 1, wherein said convexoconcave pattern is circular convexoconcave.

9. The quartz glass substrate as claimed in claim 1, wherein a dimension of said convexoconcave pattern is uniform in a vertical direction over the entire substrate surface.

10. The quartz glass substrate as claimed in claim 1, wherein a ratio of an etching rate distribution to an average etching rate is at most +/−1%.

11. The quartz glass substrate as claimed in claim 1, wherein said fictive temperature distribution at most 20° C.

12. The quartz glass substrate as claimed in claim 1, wherein said fictive temperature distribution at most 10° C.

13. A process for producing a quartz glass substrate, which comprises: (a) forming a synthetic quartz glass block by subjecting a glass-forming material to flame hydrolysis, (b) holding the quartz glass block at a temperature of from 800 to 1400° C. for at least one hour, followed by cooling slowly at a rate of at most 15° C./hr to a temperature lower by at least 200° C. than the temperature for holding, to make the fictive temperature of the quartz glass block uniform, and (c) cutting the quartz glass block in a prescribed thickness, to obtain a quartz glass substrate as claimed in claim 2.

14. The process for producing a quartz glass substrate according to claim 13, wherein the step of forming a synthetic quartz glass block, comprises (a1) depositing and growing, on a substrate, fine particles of quartz glass obtained by the flame hydrolysis, to obtain a porous synthetic quartz glass, (a2) holding the porous synthetic quartz glass at a temperature of from 1300 to 1600° C. for at least 5 hours to obtain a transparent synthetic quartz glass, and (a3) molding the transparent synthetic quartz glass into a quartz glass block.

15. The process for producing a quartz glass substrate according to claim 13, wherein the fictive temperature distribution in the quartz glass block after the step (c) is adjusted to be at most 40° C.

16. The process for producing a quartz glass substrate according to claim 13, wherein a compound having no halogen atoms is used as the glass-forming material.

* * * * *